April 3, 1951     G. A. LYON     2,547,032
WHEEL STRUCTURE
Filed Feb. 9, 1946
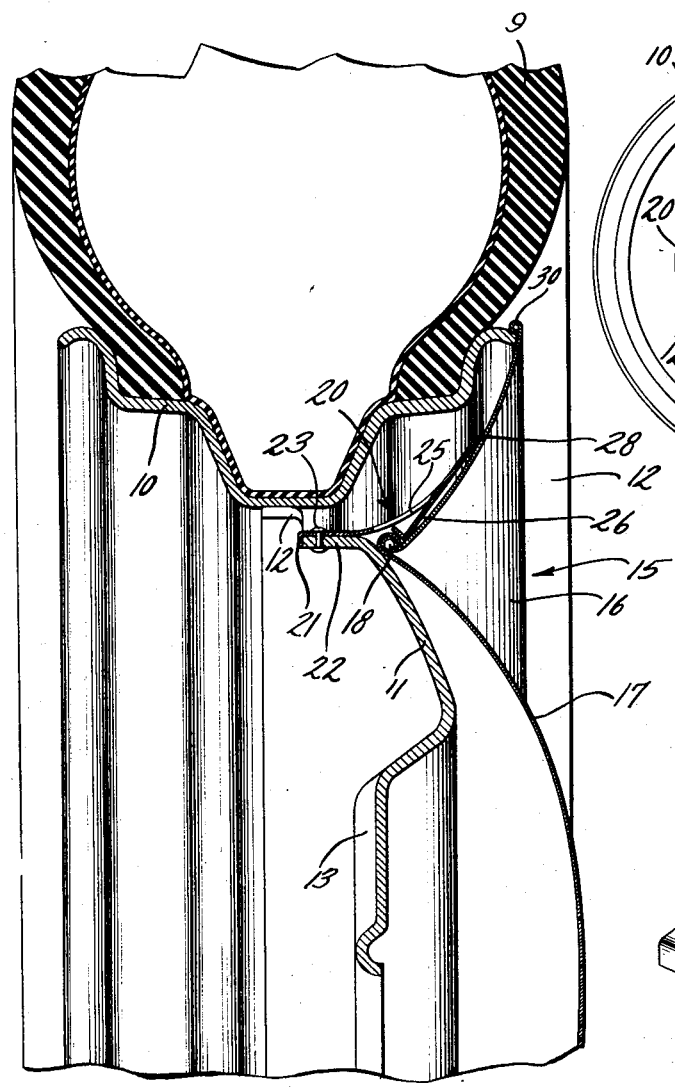
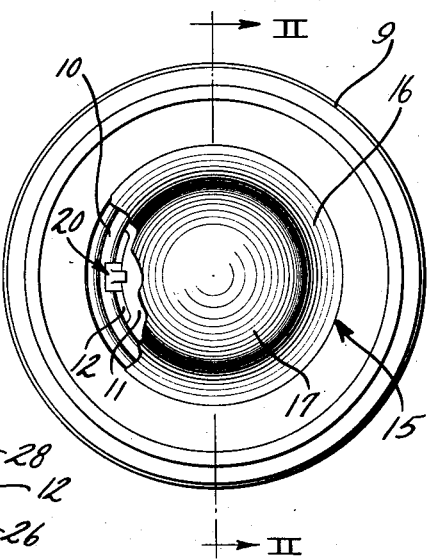
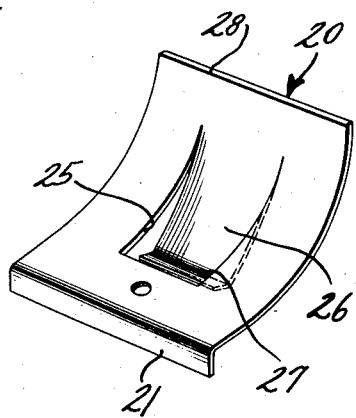
Inventor
GEORGE ALBERT LYON Patented Apr. 3, 1951

2,547,032

UNITED STATES PATENT OFFICE 2,547,032

WHEEL STRUCTURE

George Albert Lyon, Allenhurst, N. J.

Application February 9, 1946, Serial No. 646,638

2 Claims. (Cl. 301—37)

This invention relates to a cover structure for a wheel and more particularly to retaining means for securing an ornamental cover on an outer side of an automobile wheel.

An object of this invention is to provide simple but improved cover retaining means which by reason of its construction affords a rigid backing for a flexible portion thereof adapted to engage a cover to hold it on the wheel.

Another object of this invention is to provide an improved and simple cover retaining spring clip which lends itself to economical manufacture on a large production basis.

In accordance with the general features of this invention there is provided a cover structure for a wheel including tire rim and body parts and a circular cover for disposition over an outer side of the wheel having a shoulder, cover retaining means on one of the wheel parts comprising a spring extending behind the cover and provided with a tang-like finger depressed therefrom with a free extremity turned toward the axis of the wheel for tensioned engagement with the cover shoulder.

Other objects and features of this invention will more fully appear from the following detailed description taken in connection with the accompanying drawings which illustrate a single embodiment thereof and in which:

Figure 1 is a side view of a wheel and tire assembly showing my cover applied thereto and with the cover partly broken away to illustrate one of the spring cover retaining clips;

Figure 2 is an enlarged fragmentary cross sectional view taken on substantially the line II—II of Figure 1 looking in the direction indicated by the arrows; and Figure 3 is an isometric view of one of the cover retaining spring clips.

As shown on the drawings:

The character 9 designates generally a conventional pneumatic tube and tire assembly which is mounted upon the usual drop center multi-flange type of tire rim 10. This tire rim is supported upon a load bearing or body member 11 fastened at spaced intervals to the base flange of the tire rim leaving wheel openings 12 of a type that is well known in the automotive industry. The body part 11 comprises a dished or bulged stamping with a centrally depressed portion and providing a flange 13 for detachable bolt-on connection to a part on an axle, as is well known in the art.

Associated with this two-part wheel is a cover designated generally by the reference character 15 embracing the features of this invention. This cover includes an outer annular portion 16 and a central crown or hub cap simulating portion 17 joined by a seam 18 to the inner margin of the outer annular portion 16. The seam 18 in reality comprises a beaded annular shoulder disposed to the rear of the cover for cooperation with retaining clips 20 carried by the wheel body part 11.

These spring clips 20 may be of any suitable number, such, for example, as three to five, depending upon the number of wheel openings 12 and each of them extends into a wheel opening.

As best shown in Figure 3, each clip is of a curved cross sectional shape so that when the clip is mounted on the wheel it extends radially and axially outwardly from the wheel body part 11. The rear extremity of the clip is turned at 21 so as to overhang a rear edge at 22 of the wheel body part as shown in Figure 2. Any suitable means may be employed for anchoring the clip in place, such, for example, as rivet 23. In this manner the clip may be firmly attached and bottomed on the body part 11 inside of one of the wheel openings 12.

An intermediate portion of the clip 20 is cut or slotted at 25 to provide a downwardly depending finger or tang 26 which is resiliently deflectable relative to the main body of the clip. The free end of the finger or tang is turned at 27 and is so disposed that it can be cammingly engaged by the shoulder-like seam 18 of the cover 15.

It will be observed from Figure 2 that each of the clips 20 is curved radially and axially outwardly along side of the rear of the annular cover portion 16 so that the clip in reality is concealed thereby. The outer extremity 28 of the clip terminates adjacent a medial part of the annular ring 16. Then, too, the turned free ends 27 of the tangs or fingers 26 are all disposed in a common circle of such diameter as to require resilient flexure of the tangs when the shoulder of the cover is pressed thereagainst before the shoulder can pass under the tangs and against the body part 11. Once the shoulder 18 is bottomed against the body part 11, the tangs 26 will exert a resilient pressure thereon to wedge the shoulder or seam 18 tightly against the body part 11.

This tension is made possible due to the fact that the tangs 26 do not spring back completely to their original positions after they have been deflected radially outwardly by the camming action described hereinabove.

The cover 15 including the two concentric portions 16 and 17 may be made from any suitable sheet material. Both of these portions may comprise stampings, or if it is so desired the portion 16 may comprise a rolled ring.

It will be perceived that the annular portion or ring 16 has a slightly turned outer edge 30 adapted to overhang an outer edge of the tire rim 10 in close proximity to an outer side wall of the tire. In addition the annular portion 16 is of a convex-concave cross sectional contour and extends radially and axially inwardly from the turned edge 30 to the seam 18. This configuration is such that in use the ring 16 appears to constitute a continuation of the side wall of the tire 9. The appearance thus obtained may be further enhanced if the outer surface of the portion 16 has a white finish. In that event the ring portion 16 will, in use, appear to constitute a white side wall part of the tire 9, thereby giving the illusion of the tire extending clear down to the hub cap portion 17.

Removal of the cover 15 may be easily effected by inserting the end of a pry-off tool under the reinforced beaded edge 30 and forcibly ejecting the cover assembly 15 from its retained cooperation with the spring clips 20.

I claim as my invention:

1. In a wheel structure including a multi-flanged tire rim and a load-sustaining body part, the juncture of the body part and the tire rim having a plurality of wheel openings defined at the body part side thereof by a radially inwardly depressed flange portion of the body part, a cover for the outer side of the wheel including a portion of a radial extent to substantially conceal the tire rim and extending to the body part closely adjacent to said wheel openings and having a generally radially outwardly extending annular shoulder, and a retaining clip for the cover comprising a resilient sheet metal body having an axially inner portion thereof in face to face engagement with the flange defining one of said wheel openings, the inner extremity of the body being formed with a terminal flange extending angularly radially inwardly and engaging the axially inner edge of the wheel body flange, said abutting portion of the clip body being secured permanently to the wheel body flange, the axially outer portion of the clip extending substantially axially outwardly of the wheel body and curving radially outwardly behind the tire rim concealing portion of the cover, said outer portion having a cover-retaining resilient tang struck integrally therefrom and extending generally toward the axis of the wheel and into engagement with the shoulder on the cover and yieldably pressing said shoulder retainingly against the wheel body.

2. In a wheel structure including a tire rim and a wheel body with an opening at the juncture of the tire rim and wheel body including a portion of the wheel body defining a flange at the radially inner side of the opening, a cover retaining clip formed from a single piece of resilient sheet metal and including a base portion lying in flush engagement with said body flange inside said opening, a terminal flange at the inner end of the clip engaging the edge of said wheel body flange to hold the clip against tilting, and a rivet securing the clip to the wheel body flange, the outer portion of the clip extending axially substantially beyond the wheel body and being turned radially outwardly and having a cover-retaining tang struck integrally therefrom with the free end portion of the tang adjacent to but slightly spaced from the wheel body at the radially inner side of the clip whereby to be in position to yieldably engage and press a portion of a concealing cover against the wheel body.

GEORGE ALBERT LYON.

REFERENCES CITED

The following references are of record in the file of this patent:

UNITED STATES PATENTS

| Number | Name | Date |
|---|---|---|
| 2,213,861 | Horn | Sept. 3, 1940 |
| 2,304,583 | Lyon | Dec. 8, 1942 |
| 2,368,240 | Lyon | Jan. 30, 1945 |